(12) United States Patent
Desai et al.

(10) Patent No.: US 7,123,995 B1
(45) Date of Patent: Oct. 17, 2006

(54) DYNAMIC CIRCUIT OPERATION ADJUSTMENT BASED ON DISTRIBUTED ON-CHIP TEMPERATURE SENSORS

(75) Inventors: Shaishav A. Desai, Sunnyvale, CA (US); Claude R. Gauthier, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 206 days.

(21) Appl. No.: 10/838,001

(22) Filed: May 3, 2004

(51) Int. Cl.
*G05D 23/00* (2006.01)

(52) U.S. Cl. ............... 700/299; 702/132; 361/103; 361/104

(58) Field of Classification Search .......... 700/292, 700/293, 299; 702/132; 361/103, 104
See application file for complete search history.

(56) References Cited

U.S. PATENT DOCUMENTS

| | | | | |
|---|---|---|---|---|
| 5,440,520 A | * | 8/1995 | Schutz et al. | 365/226 |
| 5,502,838 A | * | 3/1996 | Kikinis | 713/501 |
| 5,585,995 A | * | 12/1996 | Baurand et al. | 361/103 |
| 5,805,403 A | * | 9/1998 | Chemla | 361/103 |
| 6,836,472 B1 | * | 12/2004 | O'Toole et al. | 370/335 |
| 6,937,958 B1 | * | 8/2005 | Gold et al. | 702/132 |
| 2003/0158683 A1 | * | 8/2003 | Gauthier et al. | 702/99 |
| 2004/0088134 A1 | * | 5/2004 | Gauthier et al. | 702/132 |
| 2005/0166166 A1 | * | 7/2005 | Chandra et al. | 716/4 |
| 2005/0257078 A1 | * | 11/2005 | Bose et al. | 714/1 |

* cited by examiner

*Primary Examiner*—Leo Picard
*Assistant Examiner*—Chad Rapp
(74) *Attorney, Agent, or Firm*—Osha·Liang LLP

(57) ABSTRACT

A plurality of on-chip temperature sensors are selectively distributed across an integrated circuit. The temperature sensors generate signals indicative of operating temperatures experienced by the portions of the integrated circuit on which the temperature sensors are disposed. Based on the temperatures of the portions of the integrated circuit, operation of particular circuitry of the integrated circuit is dynamically adjusted to counteract the effects of undesirable or unexpected operating temperatures.

23 Claims, 7 Drawing Sheets

DYNAMIC CIRCUIT OPERATION ADJUSTMENT BASED ON DISTRIBUTED ON-CHIP TEMPERATURE SENSORS

BACKGROUND OF INVENTION

A typical computer system 10, as shown in FIG. 1, includes several components that are collectively used by a user to perform various functions such as, for example, preparing and generating a document with a word processor application. With the computer system 10, the user may input data to a computing portion 12 using peripheral devices such as a keyboard 14 or a mouse 16. Data may also be provided to the computing portion 12 using data storage media, e.g., a floppy disk or a CD-ROM (not shown). The computing portion 12, using memory and other internal components, processes both internal data and data provided to the computing portion 12 by the user to generate data requested by the user. The generated data may be provided to the user via, for example, a display device 18 or a printer 20.

The computing portion 12 of a computer system typically includes various components such as, for example, a power supply, disk drives, and the electrical circuitry required to perform the necessary and requested operations of the computer system. As shown in FIG. 2, the computing portion 12 may contain a plurality of circuit boards 22, 24, 26, 28 on which various circuit components are implemented. For example, a computing portion designed to have enhanced sound reproducing capabilities may have a circuit board dedicated to implementing circuitry that specifically operate to process data associated with the reproduction of sound.

In FIG. 2, the components of exemplary circuit board 22 are shown. A crystal oscillator 30 provides a reference of time to various integrated circuits (ICs) 32, 34, 36, 38, 40, 42 (e.g., application specific integrated circuits (ASICs), field-programmable gate arrays (FPGAs), microprocessors, and digital logic chips) that are connected onto the circuit board 22. The integrated circuits 32, 34, 36, 38, 40, 42 communicate with one another, i.e., pass data, using wires or traces of conductive material (e.g., copper) (shown, but not labeled) embedded in the circuit board 22.

SUMMARY OF INVENTION

According to one aspect of one or more embodiments of the present invention, a computer system having an integrated circuit comprises (i) a first thermal sensor disposed on a first block of the integrated circuit, where the first thermal sensor is arranged to generate a first signal dependent on a temperature of the first block, (ii) a second thermal sensor disposed on a second block of the integrated circuit, where the second thermal sensor is arranged to generate a second signal dependent on a temperature of the second block, and (iii) control circuitry having an input operatively connected to the first signal and an input operatively connected to the second signal, where the control circuitry is arranged to adjust an operation of at least one of the first block and the second block dependent on the first signal and the second signal.

According to one aspect of one or more embodiments of the present invention, a computer system having an integrated circuit comprises (i) a first temperature sensor disposed on a first portion of the integrated circuit, (ii) a second temperature sensor disposed on a second portion of the integrated circuit, where an actual temperature gradient between the first portion and the second portion is determined dependent on the first temperature sensor and the second temperature sensor, and (iii) a signal driver arranged to drive a signal, where a drive strength of the signal driver is adjustable dependent on the actual temperature gradient.

According to one aspect of one or more embodiments of the present invention, a computer system having an integrated circuit comprises (i) a first temperature sensor disposed on a first block of the integrated circuit, (ii) a second temperature sensor disposed on a second block of the integrated circuit, and (iii) control circuitry arranged to adjust an operation of a circuit disposed on at least one of the first block and the second block dependent on at least one of the first temperature sensor and the second temperature sensor.

According to one aspect of one or more embodiments of the present invention, a computer system comprises (i) means for determining a temperature of a first portion of the computer system, (ii) means for determining a temperature of a second portion of the computer system, and (iii) means for dynamically adjusting an operation of at least one of the first portion and the second portion dependent on at least one of the temperature of the first portion and the temperature of the second portion.

According to one aspect of one or more embodiments of the present invention, a method for performing operations in an integrated circuit comprises (i) determining a first temperature of a first portion of the integrated circuit, (ii) determining a second temperature of a second portion of the integrated circuit, and (iii) dynamically adjusting an operation of at least one of the first portion and the second portion dependent on at least one of the first temperature and the second temperature.

Other aspects and advantages of the invention will be apparent from the following description and the appended claims.

DETAILED DESCRIPTION

Figure 1:
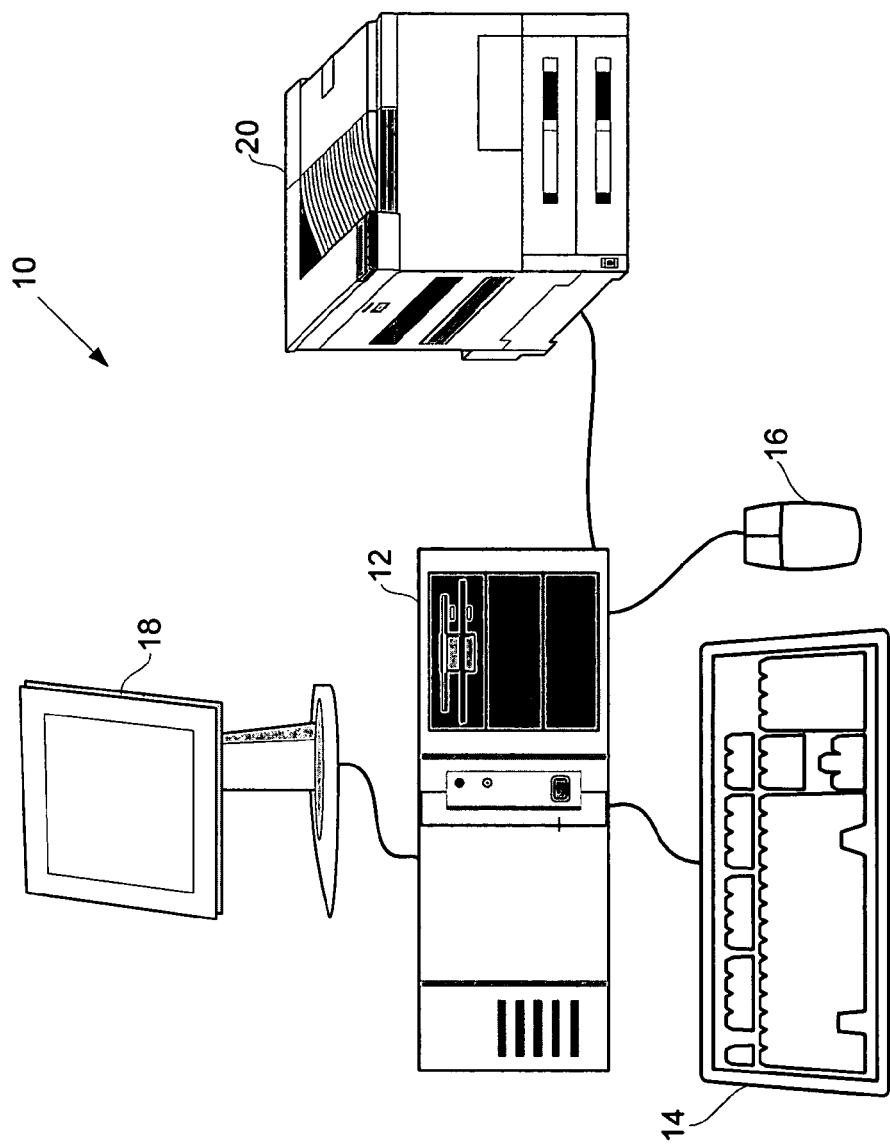
FIG. 1 shows a typical computer system.
Figure 2:
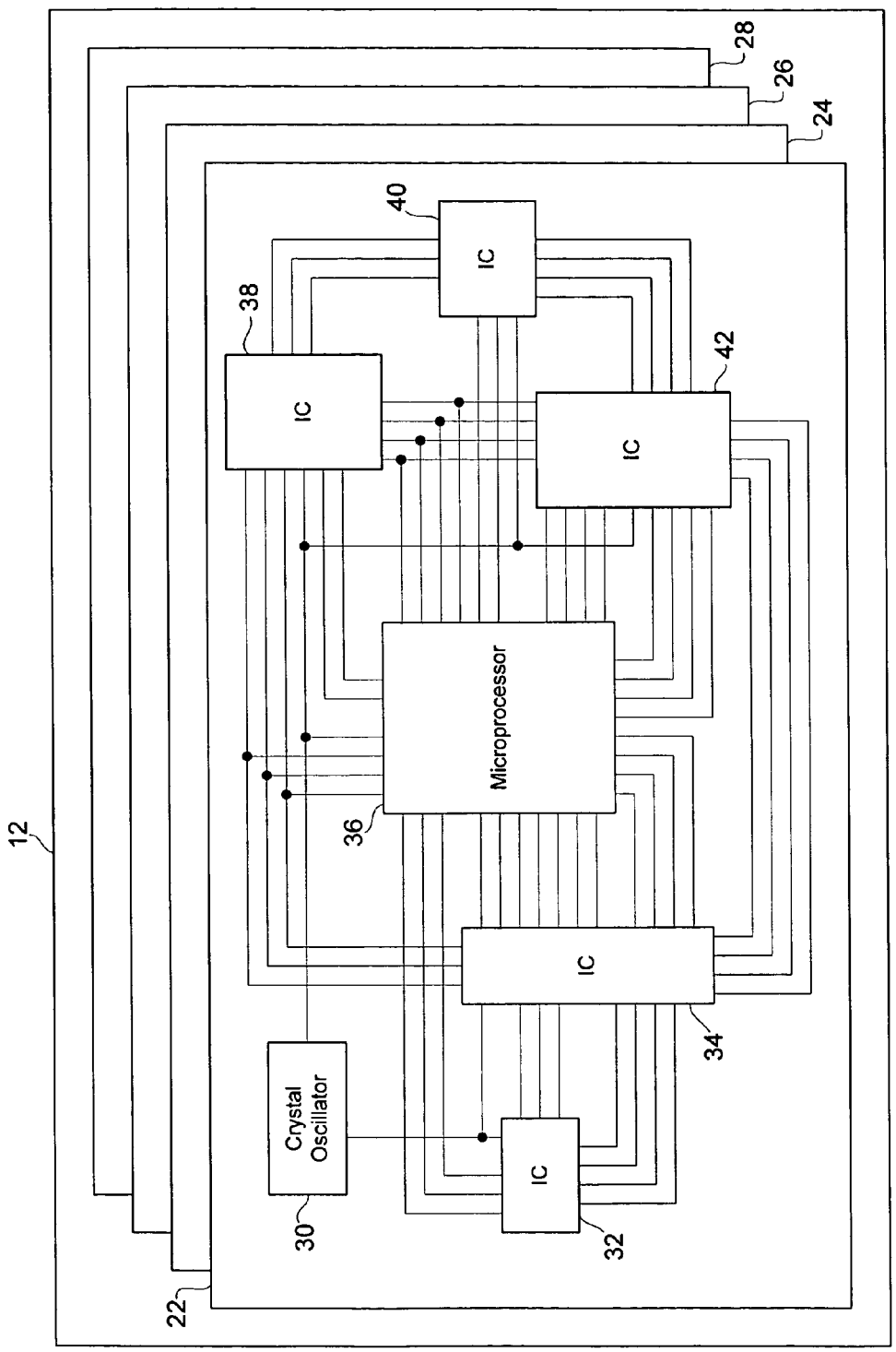
FIG. 2 shows components of a typical computer system.

An integrated circuit, such as any of the ones shown in FIG. 2, dissipates heat during operation. As integrated circuit speeds continue to increase, and as more and more devices are packed onto integrated circuits, heat dissipation concerns become more significant.

Particular portions, or "blocks," of an integrated circuit may operate at higher temperatures than other portions of the integrated circuit. For example, the block of a microprocessor on which the central processing unit (CPU) is disposed tends to operate at a higher temperature than does the block of the microprocessor on which the on-chip cache is disposed. Such differences in normal operating temperatures of blocks on an integrated circuit form temperature gradients across the integrated circuit.

A temperature gradient across two blocks of an integrated circuit may be defined as the difference between the normal operating temperatures of the two blocks. For example, the expected temperature gradient across a first block normally operating at 105 degrees and a second block normally operating at 80 degrees is 25 degrees.

Figure 3:
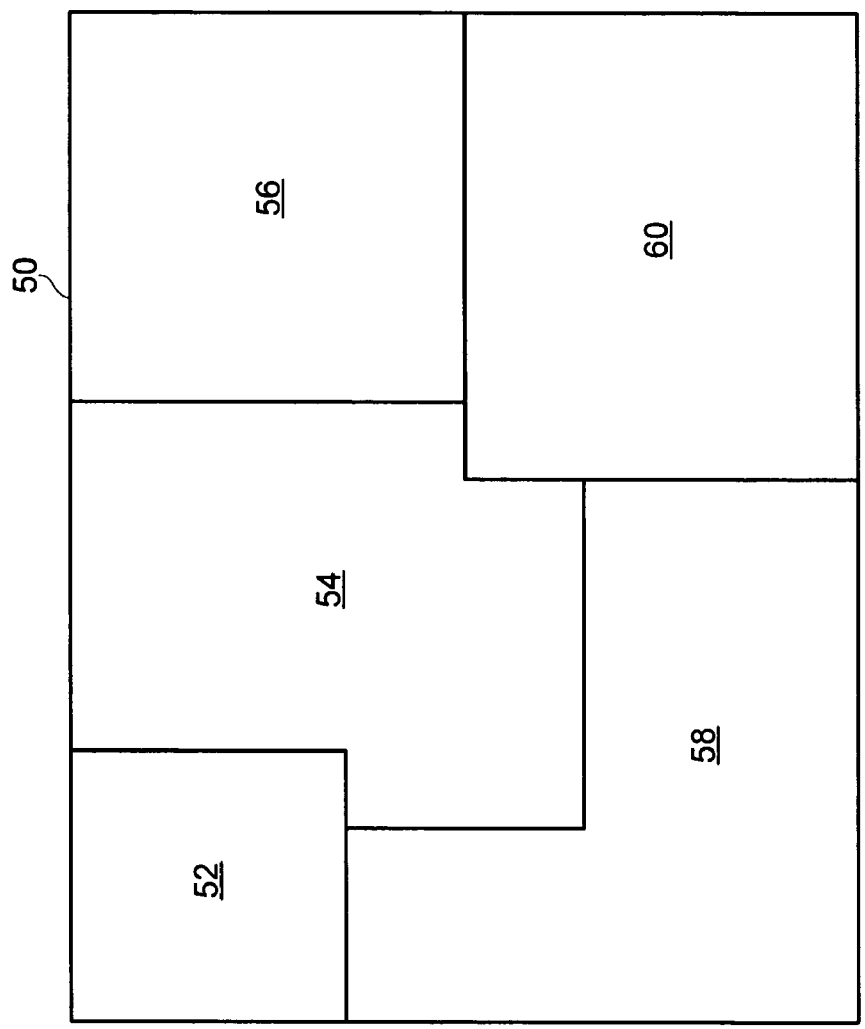
FIG. 3 shows a typical integrated circuit.

FIG. 3 shows an integrated circuit 50 having a plurality of blocks 52, 54, 56, 58, and 60 that have differing normal operating temperatures. The differences in normal operating temperatures among the plurality of blocks 52, 54, 56, 58, and 60 form temperature gradients across the integrated circuit 50.

The blocks 52, 54, 56, 58, and 60 of the integrated circuit 50 are at least partly designed based on the expected temperature gradients across the integrated circuit 50. Thus, if a particular signal is required to propagate from one block to another block, the design of the two blocks may account for the temperature gradient across the two blocks.

During operation, however, particular blocks 52, 54, 56, 58, and 60 of the integrated circuit 50 may start operating at abnormal temperatures due to, for example, integrated circuit feature degradation, integrated circuit malfunction, and undesirable ambient conditions. If the operating temperature of a particular block is outside the expected normal operating temperature range of the block, the temperature gradients among the block and other blocks differ from the expected, and designed for, temperature gradients.

The adverse effects of (i) changes in a temperature gradient across an integrated circuit and/or (ii) abnormal operating temperatures that are not guarded against by proper circuit design may cause performance degradation. Such performance loss, or outright circuit malfunction, may be caused, for example, by: increased leakage currents resulting from temperature-dependent power supply variations; loss of gain resulting from insufficient current drive associated with temperature-dependent power supply variations; increased clock skew resulting from signal loss attributable to temperature changes; and increased gate delays and loss of drive strength resulting from temperature-dependent power supply variations.

At least partly in order to prevent integrated circuit performance degradation resulting from "undesigned for" changes in an actual operating temperature of at least a portion of an integrated circuit, embodiments of the present invention relate to a technique for dynamically adjusting circuit operations based on actual integrated circuit operating temperatures determined by distributed on-chip temperature sensors.

Figure 4:
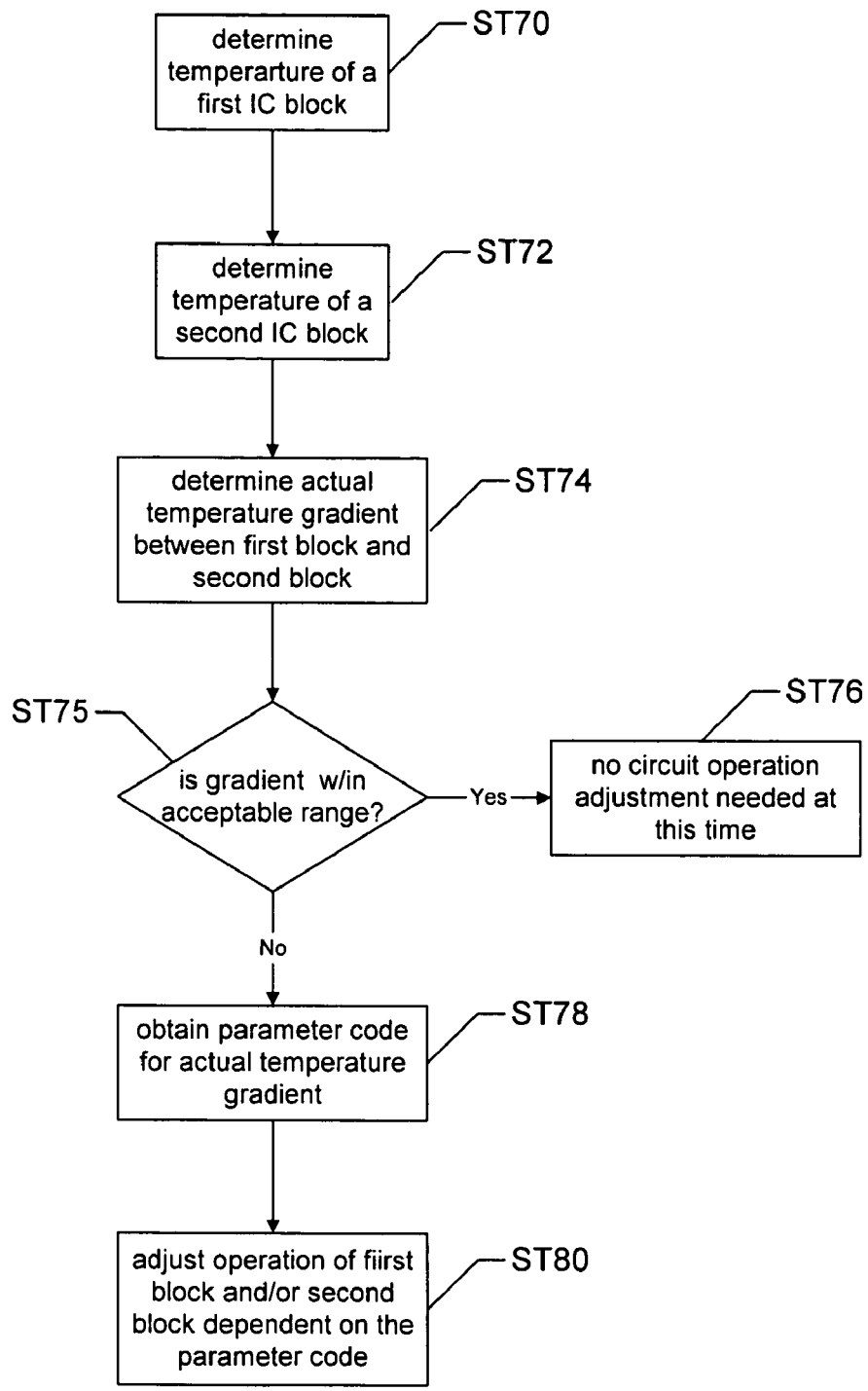
FIG. 4 shows a flow process in accordance with an embodiment of the present invention.

FIG. 4 shows an exemplary flow process in accordance with an embodiment of the present invention. In FIG. 4, an actual operating temperature of a first block of an integrated circuit is determined, for example, through measurement ST70. After, or concurrently with, determining the actual operating temperature of the first block of the integrated circuit ST70, an actual operating temperature of a second block of the integrated circuit is determined ST72. Thereafter, in this embodiment of the present invention, an actual temperature gradient between the temperature of the first block of the integrated circuit (determined at ST70) and the temperature of the second block of the integrated circuit (determined at ST72) is determined ST74.

If the actual temperature gradient determined at ST74 is within an expected, or "acceptable," range (e.g., a temperature range determined based on differences between normal operating temperatures of the first block and normal operating temperatures of the second block) ST75, the operation of the first block and the second block is not adjusted ST76. However, if the temperature gradient determined at ST74 is outside the acceptable range ST75, then a parameter code is obtained for the actual temperature gradient ST78. In one or more embodiments of the present invention, for example, the parameter code for the determined actual temperature gradient may be obtained using a look-up table.

Once the parameter code is obtained at ST78, operation of a part or all of the first block and/or the second block is dynamically adjusted dependent on the parameter code ST80. For example, if the actual temperature gradient determined at ST74 indicates that the second block is operating at an abnormally high temperature, thereby resulting in a higher-than-designed-for temperature gradient between the first block and the second block, the corresponding parameter code obtained at ST78 may cause either (i) the operation of particular circuitry in the first block to be adjusted in view of the circuitry in the first block operating at a temperature unexpectedly lower than an operating temperature of the second block and/or (2) the operation of particular circuitry in the second block to be adjusted in view of the circuitry in the second block operating at a temperature unexpectedly higher than an operating temperature of the first block.

In one or more embodiments of the present invention, the exemplary process shown in FIG. 4, or an equivalent thereof, may automatically repeat itself during operation of an integrated circuit. Further, in one or more embodiments of the present invention, the exemplary process shown in FIG. 4, or an equivalent thereof, may be run in parallel with other similar processes used to determine whether circuit operations of other portions of an integrated circuit need to be adjusted based on temperature gradient changes.

In one or more other embodiments of the present invention, operation of a part or all of the first block and/or the second block may be dynamically adjusted based on solely either the actual temperature of the first block and/or the actual temperature of the second block. In other words, operation of a part or all of the first block and/or the second block may be dynamically adjusted independent of the temperature gradient between the first block and the second block.

Figure 5:
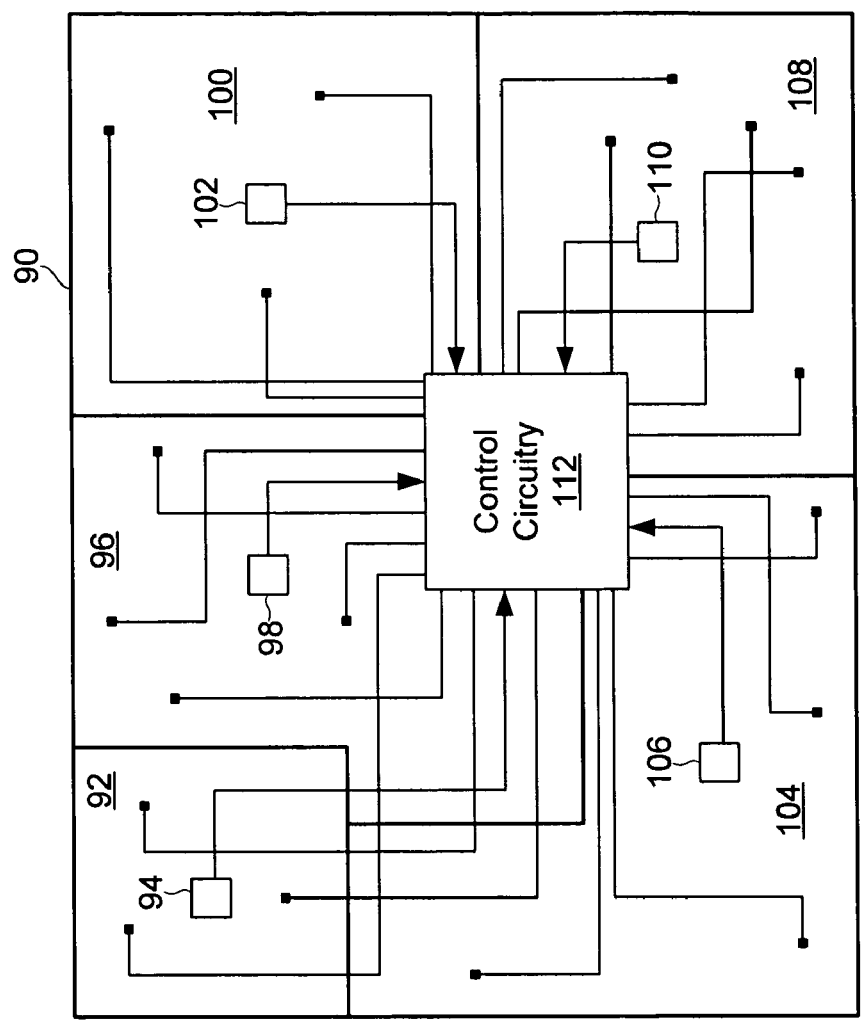
FIG. 5 shows an exemplary integrated circuit in accordance with an embodiment of the present invention.

FIG. 5 shows an exemplary integrated circuit 90 in accordance with an embodiment of the present invention. In FIG. 5, the integrated circuit 90 is shown as having a plurality of blocks 92, 96, 100, 104, and 108. Those skilled in the art will recognize that, in one or more other embodiments of the present invention, the integrated circuit 90 may have a different layout of blocks depending on various design factors.

On-chip temperature sensors 94, 98, 102, 106, and 110 are distributed on the plurality of blocks 92, 96, 100, 104, and 108, respectively. The on-chip temperature sensors 94, 98, 102, 106, and 110 are arranged to output signals that indicate temperatures of the portions of the respective blocks 92, 96, 100, 104, and 108 on which the temperature sensors 94, 98, 102, 106, and 110 are disposed.

The output signals from the temperature sensors 94, 98, 102, 106, and 110 are propagated to control circuitry 112. The control circuitry 112, in response to the signals from the temperature sensors 94, 98, 102, 106, and 110, selectively outputs signals back to portions of the plurality of blocks 92, 96, 100, 104, and 108. The signals from the control circuitry 112 are used to dynamically adjust circuit operations of the blocks 92, 96, 100, 104, and 108.

For example, if the control circuitry 112 receives signals from temperature sensors 94 and 98 that indicate that an actual temperature gradient between the respective portions of blocks 92 and 96 on which the temperature sensors 94 and 98 are disposed is outside an acceptable range, the control circuitry 112 outputs signals back that adjust circuit operations of portions of blocks 92 and/or 96 in view of the actual temperature gradient.

In another example, if the control circuitry 112 receives a signal from temperature sensor 106 that indicates that the temperature of the portion of block 104 on which the temperature sensor 106 is disposed is operating at a higher-than-expected temperature, the control circuitry 112 outputs a signal back to a portion of block 104 needing adjustment to counteract the effects of the increased operating temperature.

In one or more embodiments of the present invention, the control circuitry 112 may output signals back to any of blocks 92, 96, 100, 104, and 108 dependent on parameter codes that are hard-coded, i.e., programmed into the control circuitry 112. Such hard-coding may be achieved through the use of, for example, electrical fuses.

Further, in one or more embodiments of the present invention, the control circuitry 112 may output signals back to any of blocks 92, 96, 100, 104, and 108 dependent on parameter codes that are programmable through software. For example, parameter codes may be programmable through JTAG or ASI interfaces.

Further, in one or more other embodiments of the present invention, a plurality of temperature sensors may be disposed on one or more of the blocks 92, 96, 100, 104, and 108 of the integrated circuit.

Further, in one or more other embodiments of the present invention, a particular block may not have a temperature sensor due to, for example, operation of that block not being significantly subject to temperature variations.

Figure 6:
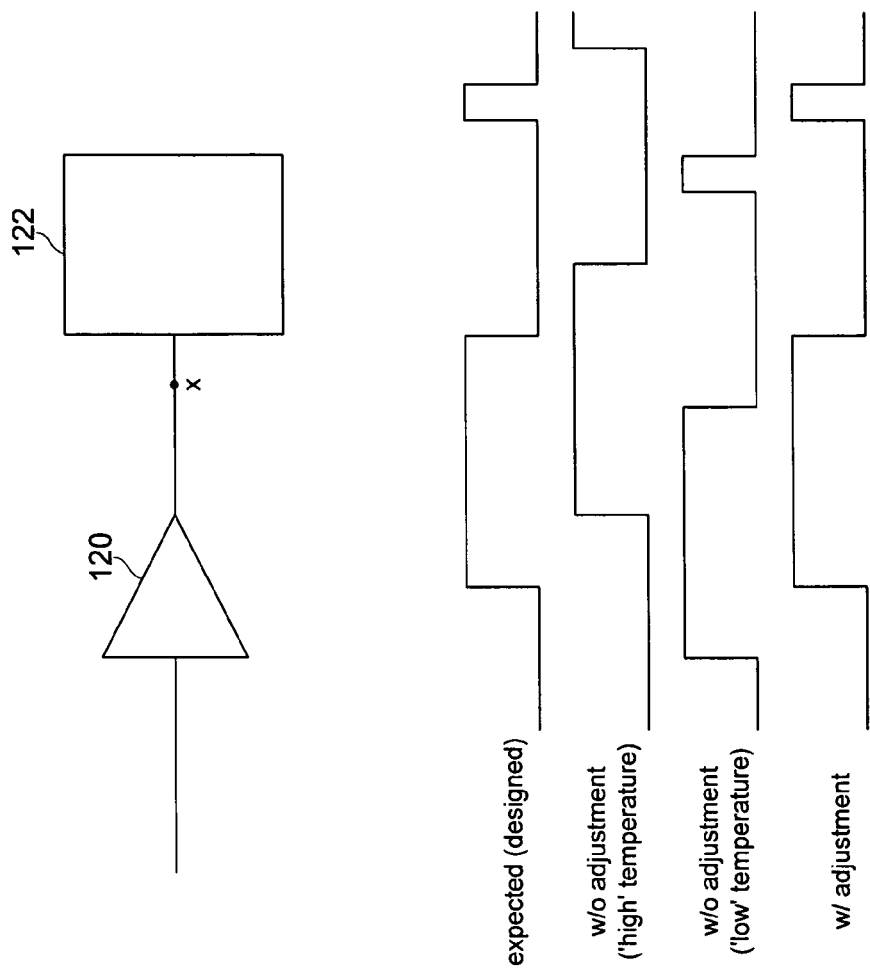
FIG. 6 shows signal waveforms associated with the prior art and in accordance with an embodiment of the present invention.

FIG. 6 shows waveforms of a signal associated with circuitry of a particular integrated circuit block. In FIG. 6, a buffer 120 outputs a signal x to a component 122. Signal x may be, for example, a clock signal or a data signal.

The first waveform in FIG. 6 shows an expected waveform of signal x. This waveform occurs when signal x is subject to operating temperatures that are expected based on, for example, determined normal operating temperatures of blocks of an integrated circuit.

The second waveform in FIG. 6 shows a waveform of signal x that may occur when signal x is subject to higher-than-expected operating temperatures. Recognizing that those skilled in the art will understand that high operating temperatures lead to decreased transistor drive strengths, higher-than-expected operating temperatures cause buffers, e.g., buffer 120 in FIG. 6, to have decreased drive strengths, thereby increasing designed delay times of the buffers. Thus, in FIG. 6, the second waveform of signal x is shown as being delayed with respect to the first shown, expected waveform of signal x.

The third waveform in FIG. 6 shows a waveform of signal x that may occur when signal x is subject to lower-than-expected operating temperatures. Recognizing that those skilled in the art will understand that low operating temperatures lead to increased transistor drive strengths, lower-than-expected operating temperatures cause buffers, e.g., buffer 120 in FIG. 6, to have increased drive strengths, thereby decreasing designed delay times of the buffers. Thus, in FIG. 6, the third waveform of signal x is shown as having a negative delay with respect to the first shown, expected waveform of signal x.

The fourth waveform in FIG. 6 shows a waveform of signal x that may occur after the operation of circuitry associated with signal x, e.g., buffer 120, is dynamically adjusted dependent on an actual operating temperature experienced by blocks of an integrated circuit that affect the behavior of signal x. For example, if a particular operating temperature causes signal x to have the behavior shown by the second waveform in FIG. 6, buffer 120 may be adjusted to increase the drive strength of buffer 120 so as to adjust signal x to the fourth waveform in FIG. 6, which is aligned with the first shown, expected waveform in FIG. 6. Alternatively, for example, if a particular operating temperature causes signal x to have the behavior shown by the third waveform in FIG. 6, buffer 120 may be adjusted to decrease the drive strength of buffer 120 so as to adjust signal x to the fourth waveform in FIG. 6, which is aligned with the first shown, expected waveform in FIG. 6.

Figure 7:
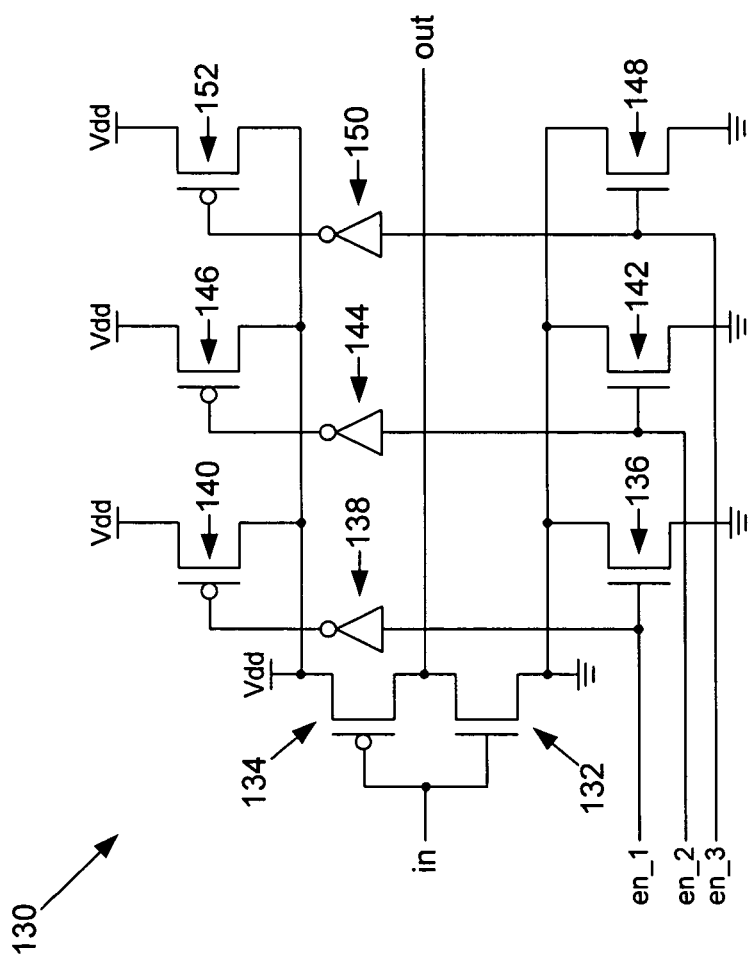
FIG. 7 shows an exemplary circuit in accordance with an embodiment of the present invention.

FIG. 7 shows exemplary circuitry 130 in accordance with an embodiment of the present invention. In FIG. 7, an input signal in serves as an input to an inverter formed by n-type device 132 and p-type device 134. The inverter formed by n-type device 132 and p-type device 134 outputs an output signal out dependent on the input signal in. The circuitry 130 also includes a plurality of "legs" respectively formed by: n-type device 136, inverter 138, and p-type device 140; n-type device 142, inverter 144, and p-type device 146; and n-type device 148, inverter 150, and p-type device 152.

When a particular leg is turned "on" by its corresponding enable signal, the drive strength of the inverter formed by n-type device 132 and p-type device 134 is increased. Conversely, when a particular leg is turned "off" by its corresponding enable signal, the drive strength of the inverter formed by n-type device 132 and p-type device 134 is decreased relative to when the leg is turned "on."

The enable signals en_1, en_2, and en_3 that respectively control the states of the legs may be generated by control circuitry, such as that shown in FIG. 5. Thus, in such an exemplary embodiment of the present invention, if an actual temperature of the circuitry 130 (as determined by, for example, a temperature sensor) is higher than expected, control circuitry, e.g., 112 in FIG. 5, may turn "on" a particular combination of the legs of circuitry 130 via assertion of the enable signals en_1, en_2, and en_3, thereby increasing the drive strength of the inverter formed by n-type device 132 and p-type device 134. Conversely, if an actual temperature of the circuitry 130 (as determined by, for example, a temperature sensor) is lower than expected, control circuitry, e.g., 112 in FIG. 5, may turn "off" a particular combination of the legs of circuitry 130 via deassertion of the enable signals en_1, en_2, and en_3, thereby decreasing the drive strength of the inverter formed by n-type device 132 and p-type device 134.

Further, in one or more embodiments of the present invention, the devices of the legs of circuitry 130 may be implemented using devices of varying sizes and strengths, thereby providing added flexibility to achieve a particular drive strength.

Advantages of the present invention may include one or more of the following. In one or more embodiments of the present invention, an operation of a circuit disposed on a portion of an integrated circuit may be dynamically adjusted dependent on an operating temperature of the portion of the integrated circuit.

In one or more embodiments of the present invention, an operation of a circuit disposed on a portion of an integrated circuit may be dynamically adjusted dependent on a temperature gradient across the integrated circuit.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system having an integrated circuit, comprising:
a first thermal sensor disposed on a first block of the integrated circuit, the first thermal sensor arranged to generate a first signal dependent on a temperature of the first block;
a second thermal sensor disposed on a second block of the integrated circuit, the second thermal sensor arranged to generate a second signal dependent on a temperature of the second block; and
control circuitry disposed on the integrated circuit having an input operatively connected to the first signal and an input operatively connected to the second signal, the control circuitry arranged to adjust a drive strength of at least one signal driver in at least one of the first block and the second block dependent on the first signal and the second signal.

2. The computer system of claim 1, wherein the control circuitry is programmable.

3. The computer system of claim 1, wherein the control circuitry comprises a storage device.

4. The computer system of claim 3, wherein the storage device comprises an electrical fuse.

5. The computer system of claim 1, wherein the control circuitry is further arranged to adjust the operation of at least one of the first block and the second block dependent on an expected difference between the temperature of the first block and the temperature of the second block.

6. The computer system of claim 5, wherein the expected difference is dependent on a difference in a normal range of the temperature of the first block and a normal range of the temperature of the second block.

7. The computer system of claim 1, wherein the control circuitry is further arranged to adjust the operation of at least one of the first block and the second block dependent on a parameter code.

8. The computer system of claim 7, wherein the parameter code is hard-coded.

9. The computer system of claim 7, wherein the parameter code is programmable.

10. The computer system of claim 7, wherein the parameter code is programmable through at least one of a JTAG interface and an AS1 interface.

11. A computer system having an integrated circuit, comprising:
a first temperature sensor disposed on a first portion of the integrated circuit;
a second temperature sensor disposed on a second portion of the integrated circuit, wherein an actual temperature gradient between the first portion and the second portion is determined dependent on the first temperature sensor and the second temperature sensor; and
a signal driver disposed in one of the first portion of the integrated circuit and the second portion of the integrated circuit arranged to drive a signal, wherein a drive strength of the signal driver is adjustable dependent on the actual temperature gradient.

12. The computer system of claim 11, further comprising:
control circuitry arranged to control a state of at least one signal to the signal driver, wherein the state of the at least signal one of increases and decreases the drive strength of the signal driver.

13. The computer system of claim 11, wherein the signal driver is disposed on one of the first portion and the second portion.

14. A computer system having an integrated circuit, comprising:
a first temperature sensor disposed on a first block of the integrated circuit;
a second temperature sensor disposed on a second block of the integrated circuit; and
control circuitry arranged to adjust a drive strength of at least one signal driver in at least one of the first block and the second block dependent on at least one of the first temperature sensor and the second temperature sensor.

15. The computer system of claim 14, wherein the control circuitry outputs an enable signal to the circuit, wherein a drive strength of the circuit is dependent on the enable signal.

16. The computer system of claim 14, wherein the control circuitry is arranged to adjust an operation of the circuit dependent on a parameter code.

17. The computer system of claim 16, wherein the parameter code is one of hard-coded into the integrated circuit and programmable through software.

18. The computer system of claim 14, wherein the control circuitry is further arranged to adjust the operation of the circuit disposed on at least one of the first block and the second block dependent on a difference between a first temperature determined by the first temperature sensor and a second temperature determined by the second temperature sensor.

19. A computer system, comprising:
means for determining a temperature of a first portion of the computer system;
means for determining a temperature of a second portion of the computer system; and
means for dynamically adjusting a drive strength of at least one signal driving means in at least one of the first portion and the second portion dependent on at least one of the temperature of the first portion and the temperature of the second portion.

20. The computer system of claim 19, wherein the means for dynamically adjusting is dependent on a difference between the temperature of the first portion and the temperature of the second portion.

21. A method for performing operations in an integrated circuit, comprising:
determining a first temperature of a first portion of the integrated circuit;
determining a second temperature of a second portion of the integrated circuit; and
dynamically adjusting a drive strength of at least one signal driver in at least one of the first portion and the second portion dependent on at least one of the first temperature and the second temperature.

22. The method of claim 21, further comprising:
dynamically adjusting the operation of at least one of the first portion and the second portion dependent on a difference between the first temperature and the second temperature.

23. The method of claim 21, wherein the dynamically adjusting comprises:
adjusting a drive strength of a circuit disposed on at least one of the first portion and the second portion.

* * * * *